US010431032B2

(12) United States Patent
Falk

(10) Patent No.: US 10,431,032 B2
(45) Date of Patent: Oct. 1, 2019

(54) METHOD AND ARRANGEMENT FOR DETECTING A QUANTITY OF PLUG CYCLES OF A PLUG CONNECTION COMPONENT

(75) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 76 days.

(21) Appl. No.: 13/823,341

(22) PCT Filed: Aug. 17, 2011

(86) PCT No.: PCT/EP2011/064129
§ 371 (c)(1),
(2), (4) Date: Mar. 14, 2013

(87) PCT Pub. No.: WO2012/034806
PCT Pub. Date: Mar. 22, 2012

(65) Prior Publication Data
US 2013/0170604 A1    Jul. 4, 2013

(30) Foreign Application Priority Data
Sep. 14, 2010   (DE) .......................... 10 2010 045 329

(51) Int. Cl.
*G07C 11/00*   (2006.01)
*H04Q 9/00*    (2006.01)

(52) U.S. Cl.
CPC .............. *G07C 11/00* (2013.01); *H04Q 9/00* (2013.01); *H04Q 2209/47* (2013.01)

(58) Field of Classification Search
CPC ...... G07C 11/00; G08B 21/00; H01R 13/641; H01R 13/6397; H01R 13/6275;
(Continued)

(56) References Cited

U.S. PATENT DOCUMENTS

| 5,400,267 A * | 3/1995 | Denen ................... A61B 17/00 |
| | | 128/908 |
| 6,735,802 B1 * | 5/2004 | Lundell ................. A61C 17/22 |
| | | 15/105 |

(Continued)

FOREIGN PATENT DOCUMENTS

| CN | 101268589 A | 9/2008 |
| DE | 4229566 | 3/1994 |

(Continued)

OTHER PUBLICATIONS

International Search Report for PCT/EP2011/064129, dated Oct. 13, 2011.

(Continued)

*Primary Examiner* — Brian Wilson
(74) *Attorney, Agent, or Firm* — Slayden Grubert Beard PLLC

(57) ABSTRACT

In order to monitor the number of plug cycles of a plug, such as a plug of a charging cable for an electric car, a plug cycle counter associated with the plug is counted up in an electronic memory after every plug cycle. A warning can thus be issued when a permitted quantity of plug cycles for the plug has been exceeded. Alternatively, the electrical connection at a charging station for an electric car or at a data cable for an automation system can also be cut off if the service life of the plug has been exceeded. High availability of the plug is thereby achieved, because the corresponding cable can be replaced in a timely manner. A hazard to persons due to defective current-carrying parts is also prevented.

15 Claims, 2 Drawing Sheets

(58) Field of Classification Search
CPC ........ H04Q 9/00; H04Q 2209/47; B60L 3/00;
B60L 53/305; B60L 53/665; B60L 53/31;
B60L 50/52; B60L 53/16; B60L 53/65;
B60L 53/18; B60L 2240/70; B60L
2250/10; B60L 2240/80; B60L 2270/36;
B60L 2270/34; B60L 2270/32; B60L
2250/20; B60L 2250/16; B60L 2250/12;
Y04S 30/14; Y02T 90/128; Y02T 90/14;
Y02T 90/121; Y02T 10/7291; Y02T
90/169; Y02T 90/163; Y02T 90/16; Y02T
10/7088; Y02T 10/7005
USPC ...................... 340/10.1, 500, 501, 511, 540,
340/572.1–572.9, 635, 654, 657, 680,
340/686.1, 686.4, 687; 377/1, 2, 15, 16,
377/38, 39; 702/34, 187
See application file for complete search history.

(56) References Cited

U.S. PATENT DOCUMENTS

| | | | |
|---|---|---|---|
| 7,321,313 B1* | 1/2008 | Inlow ................... | H01R 13/641 340/654 |
| 7,374,101 B2* | 5/2008 | Kaneko .............. | G06K 7/10178 235/492 |
| 7,618,291 B2 | 11/2009 | Standke | |
| 8,421,626 B2* | 4/2013 | Downie et al. ............ | 340/572.1 |
| 2003/0208196 A1* | 11/2003 | Stone .................... | A61B 18/14 606/41 |
| 2006/0044148 A1 | 3/2006 | Daniels et al. | |
| 2008/0318477 A1 | 12/2008 | Standke | |
| 2009/0065565 A1* | 3/2009 | Cao ..................... | A61B 18/1402 235/375 |
| 2009/0248009 A1* | 10/2009 | Zoran ................ | A61B 18/1233 606/35 |
| 2012/0007553 A1* | 1/2012 | Ichikawa ............ | B60L 11/1816 320/109 |

FOREIGN PATENT DOCUMENTS

| | | |
|---|---|---|
| DE | 19500113 | 8/1995 |
| DE | 102005046040 | 4/2007 |
| DE | 102009044140 | 4/2010 |
| DE | 102010045329.3 | 9/2010 |
| JP | 10888807 | 4/1989 |
| JP | 11-162570 | 6/1999 |
| WO | 2009/099523 | 8/2009 |
| WO | PCT/EP2011/064129 | 8/2011 |

OTHER PUBLICATIONS

Infineon ORIGA™ Product Information Page, downloaded from http://www.infineon.com/export/sites/default/en/product/promopages/origa/ORIGA.pdf, 3 pages.
True Corporation: "Tru Meia™ Products Mating Durability Test Report," http://www.tru-con.com/library/TRU_META_DurabilityReport.pdf, Oct. 2006, 9 pages.
Chinese Office Action dated Nov. 28, 2014 in corresponding Chinese Patent Application No. 201180044262.2.

* cited by examiner

METHOD AND ARRANGEMENT FOR DETECTING A QUANTITY OF PLUG CYCLES OF A PLUG CONNECTION COMPONENT

CROSS REFERENCE TO RELATED APPLICATIONS

This application is based on and hereby claims priority to International Application No. PCT/EP2011/064129 filed on Aug. 17, 2011 and German Application No. 10 2010 045 329.3 filed on Sep. 14, 2010, the contents of which are hereby incorporated by reference.

BACKGROUND

A plug connection includes a male component and a female component. The male plug connection component is designated as a plug. Female plug connection components are subdivided into socket jacks, outlet sockets and connector sockets. Whereas outlet sockets are usually installed in a wall, socket jacks refer to female plug connection components at devices. In the case of extension cables, the female plug connection components are designated connector sockets.

Plug connections are used to connect and separate electrical and optical conductors. The respective conductors are used, for example, for data communication, e.g. for a maintenance access point. Commercially available plug connection components are thus found at the ends, for example, of RJ45, M12, RS232 and USB cables. A further important use of plug connection components is the use thereof in charging cables which are used for the power supply, for example, to an electric car.

A plug cycle denotes the sequence of plugging and unplugging a plug connection component. The expression "plugging procedure" is understood below to mean either plugging-in, unplugging or a complete plug cycle.

WO 2009/099523 A1 discloses that, in medical technology, the number of plug cycles of plugs is to be restricted in order to meet requirements for sterility or other regulations. For this purpose, the document proposes a mechanical modification of a plug which restricts the number of plug cycles. The restriction is achieved by mechanical, rotating components which prevent further use of the plug after completion of the permitted number of plug cycles.

Methods are also known from the related art for determining productivity. Apart from the generally known RFID and bar code technology, a product authentication module Infineon ORIGA® is known (see http://www.infineon.com/export/sites/default/en/product/promopages/origa/ORIGA.pdf, obtainable on the internet on Sep. 9, 2010). This product authentication module is able to detect a product identity in a manner involving manipulation prevention.

Systems for monitoring logistics chains are also known. Herein, objects such as containers, pallets, medication packages, etc. are provided with an identifier. The identifier is detected at pre-determined locations. Information concerning the detection location and detection time is entered into a database.

The mechanical limitation of the number of plug cycles of a plug as known from the related art requires a modification of the design of the plug, thereby increasing the production costs thereof.

SUMMARY

It is therefore one possible object to provide a method and an arrangement for detecting a quantity of plug cycles of a plug connection component which offer an alternative to the known related art.

The inventor proposes a method to which a detection unit detects a plugging procedure of the plug connection component. The method is characterized in that a microprocessor then updates a plug cycle counter in an electronic memory store.

The inventor also proposes an arrangement for detecting a number of plug cycles of a plug connection component has a detection unit which is configured to detect a plugging procedure of the plug connection component. The arrangement is characterized by a microprocessor which is programmed for electronically updating a plug cycle counter after each plugging procedure. The arrangement is also characterized by an electronic memory store which is configured to store the plug cycle counter.

Underlying the proposals is the observation that, apart from the aforementioned medical technological requirements, there are other considerations and reasons for monitoring plug cycles of a plug connector. The proposals are based on the realization that the number of plug cycles during which correct functioning of the plug connector can be assured is limited. Plug connectors are fundamentally subject to wear which limits their service life.

The proposals are based, in particular, on the understanding that, increasingly, plug connectors which are not intended for a rugged industrial environment or for frequent plug cycles, are nevertheless used for such applications. For example, a network access for servicing an industrial system is nowadays often realized with a conventional RJ45 Ethernet interface.

The method and the arrangement ensure a high degree of availability for the plug connection components, since the components can be exchanged in a timely manner through the detection of the number of plug cycles. Furthermore, with energy-carrying cables, such as charging cables or mains cables, hazards to humans due to defective plugs are prevented.

In one development, a computer unit compares the plug cycle counter with a threshold value. A switch switches an electrical connection to the connecting component provided the plug cycle counter does not exceed the threshold value. Alternatively, the switch opens the electrical connection to the plug connection component as soon as the plug cycle counter exceeds the threshold value.

In a first case, the plug cycle counter is initialized to zero and then incremented after each plug cycle. The threshold value is an allowed number of plugging procedures. In a second case, the plug cycle counter is initialized with the permitted number of plugging procedures and is decremented after each plug cycle. The threshold value is then, for example, 1. Exceeding the threshold value occurs in the first case precisely when the plug cycle counter is greater than the threshold value. In the second case, exceeding the threshold value occurs when the plug cycle counter is smaller than the threshold value.

This development has the advantage that a user is protected against an electric shock from a defective plug connector.

In another development, a computer unit also compares the plug cycle counter with a threshold value and generates a warning if the plug cycle counter exceeds the threshold value.

According to one embodiment, the plug cycle counter is incremented on updating. Alternatively, the plug cycle counter is decremented on updating.

In another development, the electronic memory store is provided on a server. An identifier of the plug connection component, in particular a serial number, URL or NAI is transferred to the server. The server identifies the plug cycle counter from among a plurality of counters based on the identifier.

According to one embodiment, the detection unit is a sensor, in particular a mechanical sensor or proximity switch. Alternatively, the detection unit is configured for detecting an electrical connection based on an internal resistance.

In an alternative embodiment, the electronic memory store is arranged in the plug connection component.

In another development, the plug connection component is equipped with an RFID interface which is suitable for reading out the plug cycle counter or an identifier.

Furthermore, the inventor proposes a machine-readable data carrier on which is stored a microprogram which carries out the method when the program is executed in a microprocessor. The inventor also proposes a microprogram which is executed in a microprocessor and thus carries out the method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
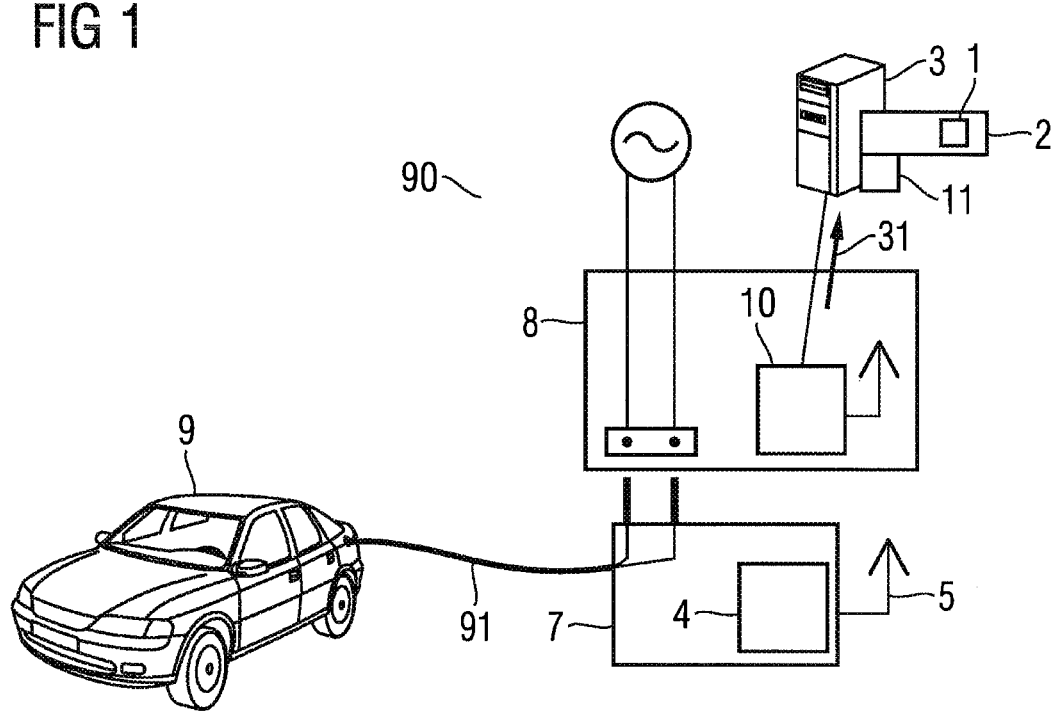
FIG. 1 is a plug connection according to a first exemplary embodiment.

Reference will now be made in detail to the preferred embodiments of the present invention, examples of which are illustrated in the accompanying drawings, wherein like reference numerals refer to like elements throughout.

FIG. 1 shows a charging station 90 to which an electric car 9 is connected with a charging cable 91. The charging station 90 enables detection of a number of plug cycles of a plug connection component 7, in this case a plug. For this purpose, the plug connection component 7 has an identifier 4. The identifier 4 is configured, for example, as a bar code. In this case, an outlet socket 8 of the charging station 90 has a reading device 10 which is configured as a barcode scanner. If, however, the identifier 4 is stored in an RFID chip or an RFID label, the plug connection component 7 has an RFID interface 5. The reading device 10 is then configured to read the RFID label or the RFID chip in the interior of the housing of the plug connection component 7.

The reading out of the identifier 4 by the reading device 10 takes place during creation of the plug connection. The identifier 4 is then transferred with a request 31 to a server 3. The server 3 has an electronic memory store 2 in which a plug cycle counter 1 for the plug connection component 7 is stored. In order to identify the plug cycle counter 1 for the plug connection component 7, the server 3 requires the identifier 4. Subsequently, the server 3 increments the plug cycle counter 1 with a microprocessor 11.

The identifier 4 is, for example, a serial number (e.g. 1376543). The identifier can alternatively be a URL (e.g. http://count.siemens.com/up?13746543) or can be configured as an NAI (abbreviation for "network access identifier", e.g. 1376543@count.siemens.com). Address information from the server 3 is encoded directly in the identifier 4.

As an alternative to FIG. 1, a plug, which is connected via a charging cable to a charging column, can be connected to an outlet socket or a socket jack of the electric car 9.

In a deviation from the first exemplary embodiment shown in FIG. 1, the server 3 is omitted. In this case, the electronic memory store 2, the microprocessor 11 and the plug cycle counter 1 are received in the outlet socket 8 or another part of the charging station 90. This has the advantage that a separate server 3 is not required.

Figure 2:
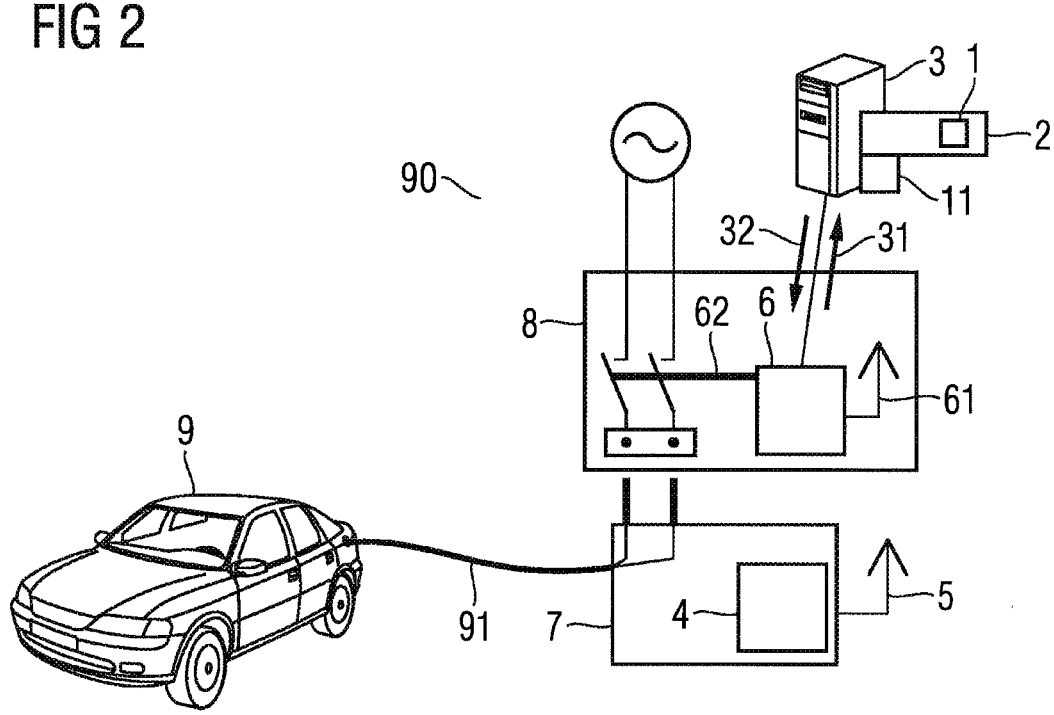
FIG. 2 is a plug connection according to a second exemplary embodiment.

FIG. 2 also shows a charging station 90 for an electric car 9. Here also, a charging cable 91 is plugged with a plug connection component 7 which comprises an identifier 4 and an RFID interface 5, into an outlet socket 8. A computer unit 6 in the outlet socket 8 or in another part of the charging station 90 detects, with the aid of an antenna 61, the identifier 4 of the plug connection component 7, which is communicated via the RFID interface 5 on plugging in the plug connection component 7. The computer unit 6 then transmits a request 31 to a server 3 which, as described in the first exemplary embodiment, increments a plug cycle counter 1 in an electronic memory store 2 with the aid of a microprocessor 11. However, the plug cycle counter 1 is now compared with a threshold value. The threshold value is a maximum number of permitted plug cycles for the plug connection component 7. The threshold can be stored in a database of the server 3 or on the plug connection component 7. If the number of plug cycles for the plug connection component 7 permitted with the threshold value has been exceeded, the computer unit 6 receives a response 32 from the server 3 which prohibits use of the plug connection component 7. Thereafter, the computer unit 6 outputs, for example, a warning to a user with the aid of a warning light or enters the warning in an error or diagnosis memory store. The computer unit 6 is, for example, a digital circuit, a microprocessor or a microcontroller.

FIG. 2 shows that the computer unit 6 breaks an electrical connection to the plug connection component 7 based on the response 32 of the server 3 which indicates exceeding of the threshold value, with the aid of a switch 62. The use of the plug connection component 7 or of the charging cable 91 is thereby prevented.

An electrical connection for charging the electric car 9 is only created provided the threshold value of plug cycles for the plug connection component 7 has not yet been exceeded. In this case, the server 3 sends an OK as the response 32, whereupon the electrical connection is created by closing the switch 62.

Figure 3:
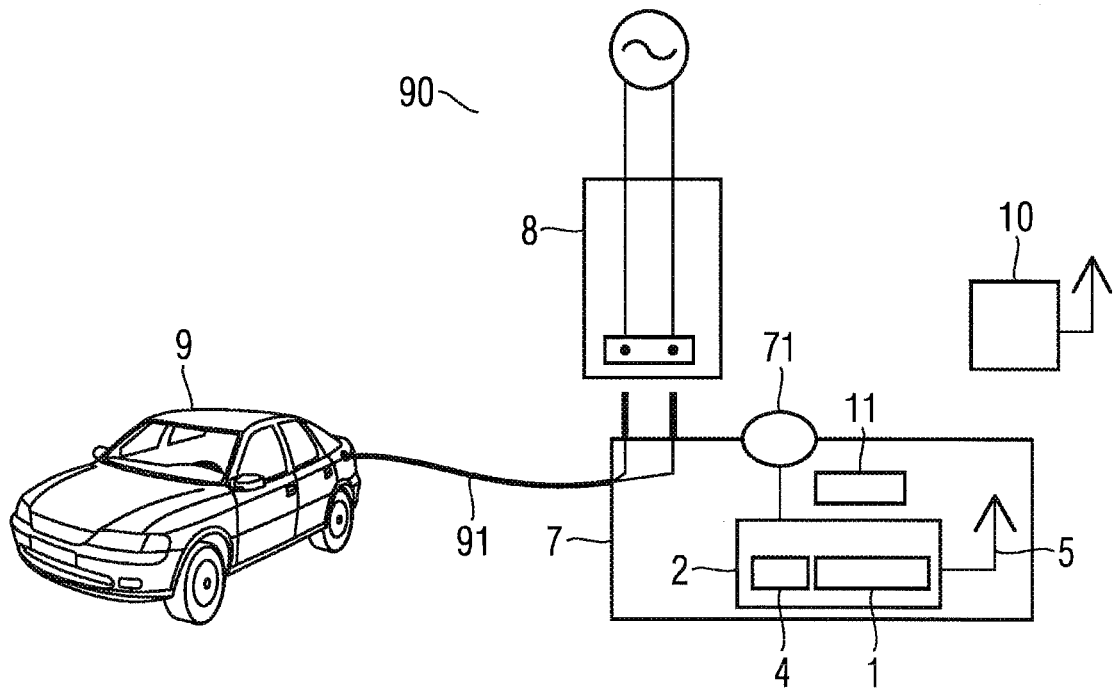
FIG. 3 is a plug connection according to a third exemplary embodiment.

FIG. 3 shows a third exemplary embodiment of the charging station 90. In this case, the plug connection component 7 of the charging cable 91 comprises a dedicated electronic memory store 2 in which not only the identifier 4, but also the plug cycle counter 1 is stored. Furthermore, the plug connection component 7 also has available a microprocessor 11 which is suitable for incrementing the plug cycle counter 1. The microprocessor 11 can be accommodated, for example, in an RFID chip and can optionally be configured as a microcontroller or a simple digital circuit. In order to recognize the plugging-in of the plug connection component 7 into an outlet socket 8, the plug connection component 7 comprises a sensor 71 which registers the plugging-in. Thereafter, the plug cycle counter 1 is incremented by the microprocessor 11. The plug connection component 7 therefore itself counts the plug cycles thereof.

A mechanical switch which, for example, is closed on inserting the plug connection component 7, or a proximity sensor is suitable as the sensor. Alternatively, the creation of an electrical connection of the plug contact of the plug connection component 7 can be detected by the internal resistance thereof.

The plug cycle counter 1 as shown in FIG. 3 is also readable via an RFID interface 5. For this purpose, a reading device 10 is shown in FIG. 3. The plug cycle counter 1 can be read out on creation of a plug connection, but also at any other time point.

Figure 4:
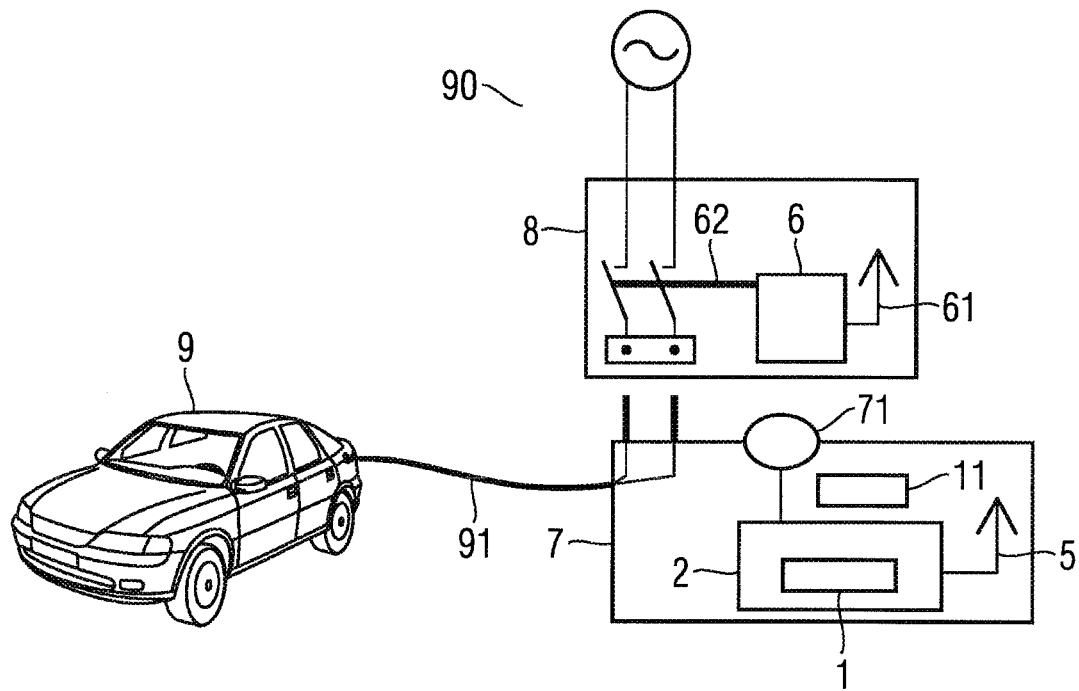
FIG. 4 is a plug connection according to a fourth exemplary embodiment.

FIG. 4 shows a fourth exemplary embodiment for the charging station 90. An electric car 9 is connected to an outlet socket 8 by a charging cable 91 which has a plug connection component 7. The plug connection component 7 again has an electronic memory store 2 in which a plug cycle counter 1 is stored. The electronic memory store 2 is arranged, for example, in an RFID chip which also comprises a microprocessor 11 and an RFID interface 5. The electronic memory store 2 and the microprocessor 11 can be accommodated together in a microcontroller on an RFID chip. In this exemplary embodiment also, a sensor 71 is provided for recognizing the plugging-in of the plug connection component 7.

During or following the plugging-in, a computer unit 6 in the outlet socket 8 reads the plug cycle counter 1 of the plug connection component 7 with the aid of an antenna 61. Only if the counter exceeds a threshold value is an electrical connection created by closing a switch 62. The threshold value is stored either in the outlet socket 8 or in the electronic memory store 2 of the plug connection component 7. The computer unit 6 is, for example, a digital circuit, a microprocessor or a microcontroller.

The above exemplary embodiments concerned a charging cable or a charging station for an electric car. Further exemplary embodiments concern any desired other electrical or optical plug connectors, for example, for data cables for connecting a maintenance device to an industrial system or an automation component. For this purpose, for example, an RJ45 plug connector, an M12 plug connector, an RS232 plug connector or a USB plug connector can be used. The plug connection components concerned are configured as previously described in the example of the charging station.

Consequently, the previously described plug connection components, reading devices, servers, etc., are also usable in order to connect an automation component to a control network, for example, an Ethernet network or an IP network. If, for example, in the case of flexible manufacturing, different automation components are frequently connected to a control network, then using the plug cycle counter, overloading of a plug connection component can be detected. The component can thus be exchanged in good time. Any danger to the operator by a damaged voltage-carrying plug connector is thereby prevented. Similarly, failure of the automation system or faulty execution of automation processes caused by disrupted transmission of control data due to an overloaded plug connector are prevented.

In the exemplary embodiments set out above, in the event of a plugging procedure of a plug connection component, an associated plug cycle counter is incremented. Incrementing means that the plug cycle counter is increased by the value one in each case. Alternatively, the plug cycle counter can be decremented by the value one after each plugging procedure. In this case, the plug cycle counter is initialized to a maximum number of permitted plugging procedures. The plug cycle counter then shows the number of currently still permitted plugging procedures.

The exemplary embodiments described can be freely combined with one another.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for monitoring a number of plug cycles of a plug of a cable for controlling an electrical connection between a charging system and a chargeable battery configured for connection to the charging system via the cable, the method comprising:
    using a detection unit to detect the plug being inserted into an outlet socket of the charging system;
    wherein the plug comprises an identifier associated with the plug and wherein the outlet socket or another component of the charging system detects the identifier from the plug;
    communicating the detected identifier to a charging system computer unit that stores a plug cycle counter value associated with the plug and a threshold value;
    comparing, by the charging system computer unit, the value of the plug cycle counter with the threshold value;
    if the value of the plug cycle counter does not exceed the threshold value, controlling a switch to connect or maintain connection of the electrical connection to allow charging of the chargeable battery by the charging system via the cable, and
    if the value of the plug cycle counter does exceed the threshold value, controlling the switch to disconnect or maintain disconnection of the electrical connection to prevent charging of the chargeable battery by the charging system via the cable.

2. The method as claimed in claim 1, further comprising:
    closing the switch to connect or maintain connection of the electrical connection to the outlet socket when the value of the plug cycle counter does not exceed the threshold value; and
    opening the switch to disconnect or maintain disconnection of the electrical connection to the plug when the value of the plug cycle counter exceeds the threshold value.

3. The method as claimed in claim 2, wherein
    the value of the plug cycle counter is decremented each time the plug in plugged into the outlet socket or another outlet socket, and
    exceeding the threshold value occurs when the value of the plug cycle counter is smaller than the threshold value.

4. The method as claimed in claim 1, further comprising generating a warning when the value of the plug cycle counter exceeds the threshold value.

5. The method as claimed in claim 1, wherein the value of the plug cycle counter is incremented each time the plug in plugged into the outlet socket or another outlet socket.

6. The method as claimed in claim 1, wherein the value of the plug cycle counter is decremented each time the plug in plugged into the outlet socket or another outlet socket.

7. The method as claimed in claim 1, wherein the identifier comprises a serial number, a uniform resource locator (URL) or a network access identifier (NAI).

8. The method as claimed in claim 1, wherein the threshold value is stored in the electronic memory.

9. The method as claimed in claim 1, wherein the charging system includes a charging station including the outlet socket, and wherein the charging system computer unit comprises a server remote from the charging station.

10. The method as claimed in claim 1, further comprising incrementing or decrementing the value of the plug cycle counter in response to the detection of the plug being inserted into the outlet socket.

11. A system to monitor a number of plug cycles of a plug of a cable for controlling an electrical connection between a charging system and a chargeable battery configured for connection to the charging system via the cable, the system comprising;
    the plug comprising an electronic memory storing a plug cycle counter and an RFID interface for transmitting a value of the plug cycle counter;
    a detection unit to detect a plugging procedure of the plug;
    an antenna for receiving the value of the plug cycle counter;
    a switch operable to control the electrical connection between the charging system and the chargeable battery;
    a microprocessor updating the value of the plug cycle counter and comparing the value of the plug cycle counter with a threshold value and,
    when the value of the plug cycle counter does not exceed the threshold value, using the switch to establish or maintain the electrical connection to allow charging of the chargeable battery by the charging system via the cable, and
    when the value of the plug cycle counter does exceed the threshold value, using the switch to disconnect the electrical connection to prevent charging of the chargeable battery by the charging system via the cable.

12. The device as claimed in claim 11, wherein the detection unit comprises mechanical sensor or a proximity switch.

13. A non-transitory computer readable storage medium comprising a microprogram, which when executed in a microprocessor causes a computer of a charging system associated with a socket to control an electrical connection between the charging system and a chargeable battery configured for connection to the charging system via the cable, the method comprising:
    detecting a plugging procedure of the plug into the socket associated with the charging system; and
    in response to detecting the plugging procedure of the plug into the socket:
    updating a value of a plug cycle counter in an electronic memory; and
    sending a wireless electronic communication to the computer of the charging system associated with the socket, the wireless electronic communication including the value of the plug cycle counter and a threshold value for comparison with the value of the plug cycle counter by the computer of the charging system associated with the socket for selectively controlling the electrical connection between the charging system and the cable to selectively enable and disable charging of the chargeable battery by the charging system.

14. A method for monitoring a number of plug cycles of a plug of a charging cable for controlling an electrical connection between a charging system and a chargeable battery configured for connection to the charging system via the charging cable, the method comprising:
    using a detection unit to detect a plugging procedure of the plug and read an identifier associated with the plug;
    wherein the plug comprises an RFID interface for communicating the identifier;
    communicating a notification from the detection unit to a remote server having an electronic memory and a microprocessor, the notification including the identifier;
    when the notification is received, using the microprocessor to update a value of a plug cycle counter in the electronic memory, the plug cycle counter counting plug cycles of the plug;
    comparing the value the plug cycle counter with a threshold value;
    when the value of the plug cycle counter does not exceed the threshold value, connecting or maintaining connection of the electrical connection to allow charging of the chargeable battery by the charging system via the charging cable; and
    when the value of the plug cycle counter does exceed the threshold value, disconnecting or maintaining disconnected the electrical connection to prevent charging of the chargeable battery by the charging system via the charging cable.

15. A system to monitor a number of plug cycles of a plug of a cable for controlling an electrical connection between a charging system and a chargeable battery configured for connection to the charging system via the cable, the system comprising;
    a plug comprising a memory storing a plug cycle counter and an RFID interface for transmitting a message including a value of the plug cycle counter;
    an antenna for receiving the message;
    a detection unit to detect a plugging procedure of the plug;
    a switch operable to control the electrical connection between the charging system and the cable;
    a computer associated with a socket in communication with the antenna;
    wherein the value of the plug cycle counter is electronically updated after each detected plugging procedure, the plug cycle counter counting the number of plug cycles of the plug;
    the computer comparing the value of the plug cycle counter with a threshold value, and when the value of the plug cycle counter does exceed the threshold value, using the switch to disconnect the electrical connection to prevent charging of the chargeable battery by the charging system via the cable.

* * * * *